(12) United States Patent
Reichweger et al.

(10) Patent No.: US 7,571,703 B2
(45) Date of Patent: Aug. 11, 2009

(54) BALANCING SHAFT

(75) Inventors: Andreas Reichweger, Behamberg (AT); Roland Marzy, Steyr (AT); Ewald Sieberer, Steinbach (AT)

(73) Assignee: Magna Drivetrain AG & Co KG, Lannach (AT)

( * ) Notice: Subject to any disclaimer, the term of this patent is extended or adjusted under 35 U.S.C. 154(b) by 106 days.

(21) Appl. No.: 11/666,930

(22) PCT Filed: Nov. 8, 2005

(86) PCT No.: PCT/AT2005/000446

§ 371 (c)(1),
(2), (4) Date: Nov. 15, 2007

(87) PCT Pub. No.: WO2006/047807

PCT Pub. Date: May 11, 2006

(65) Prior Publication Data

US 2008/0121203 A1  May 29, 2008

(30) Foreign Application Priority Data

Nov. 8, 2004  (AT) ............................. GM803/2004

(51) Int. Cl.
*F02B 75/06* (2006.01)

(52) U.S. Cl. .................... 123/192.2; 74/603

(58) Field of Classification Search ............. 123/192.2; 74/603
See application file for complete search history.

(56) References Cited

U.S. PATENT DOCUMENTS

| 5,857,388 A | 1/1999 | Killion et al. |
| 2001/0029919 A1 | 10/2001 | Cagney et al. |

FOREIGN PATENT DOCUMENTS

| DE | 42 11 629 A1 | 10/1993 |
| DE | 198 07 180 A1 | 8/1999 |
| EP | 1 081 410 A1 | 3/2001 |
| FR | 2 627 803 A1 | 9/1989 |
| JP | 61-84434 A | 4/1986 |

*Primary Examiner*—Noah Kamen
(74) *Attorney, Agent, or Firm*—Harness, Dickey & Pierce, P.L.C.

(57) ABSTRACT

The invention relates to a balancing shaft, whose balancing weight is located between two cylindrical bearing surfaces and which is configured as one piece with said weight. The end cross-sections of the balancing weight are circular segments that are delimited by an arc and a secant. The aim of the invention is to configure the balancing shaft in such a way that the mass effect and rigidity are optimal. To achieve this, the contours of the balancing weight on the plane that is fixed by the secants of the two end cross-sections taper from the two end cross-sections towards the longitudinal centre and the contours on the normal plane form a straight line in relation to said plane.

17 Claims, 2 Drawing Sheets

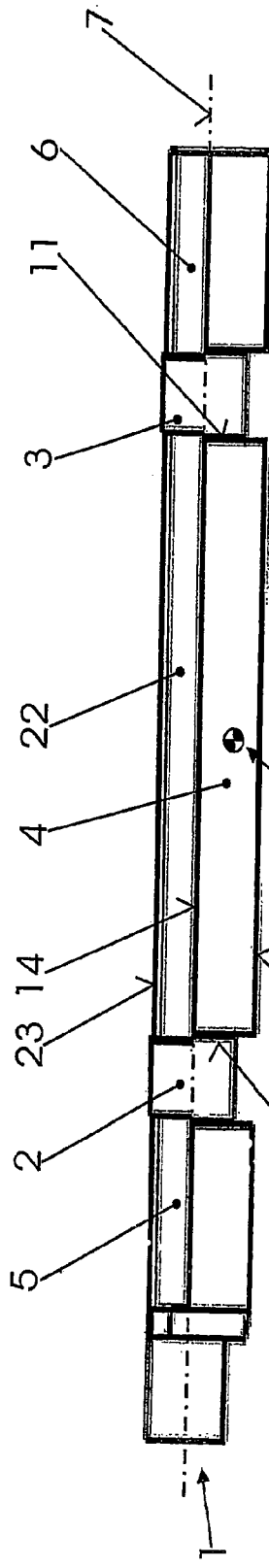
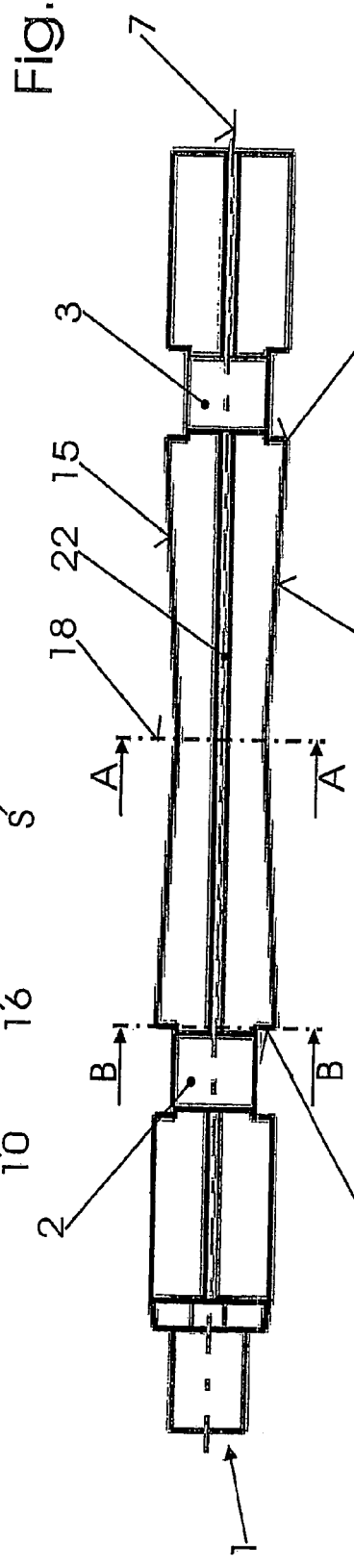
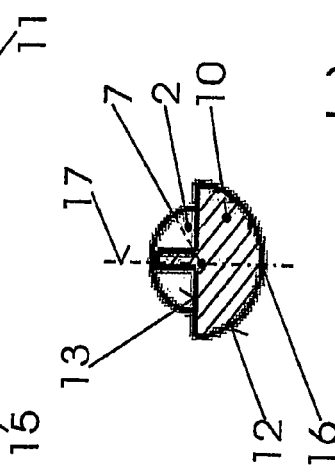
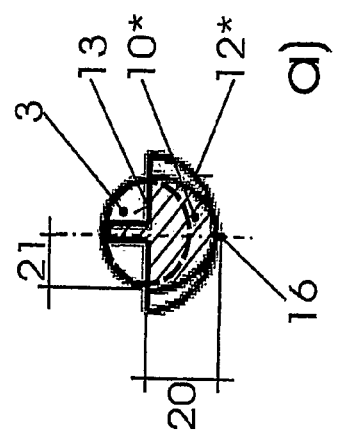

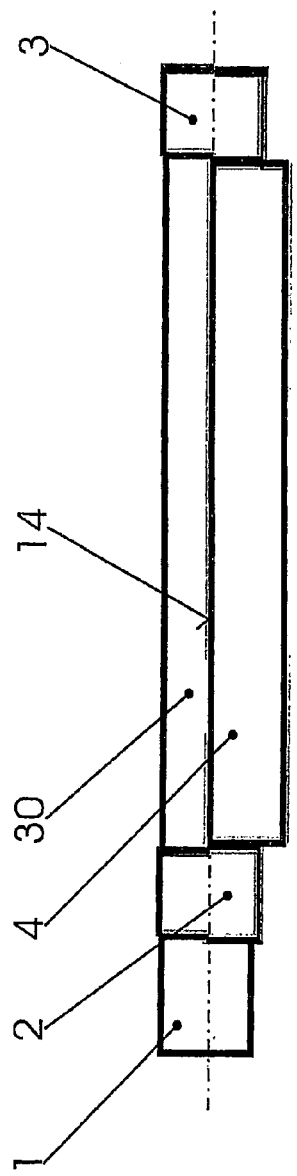
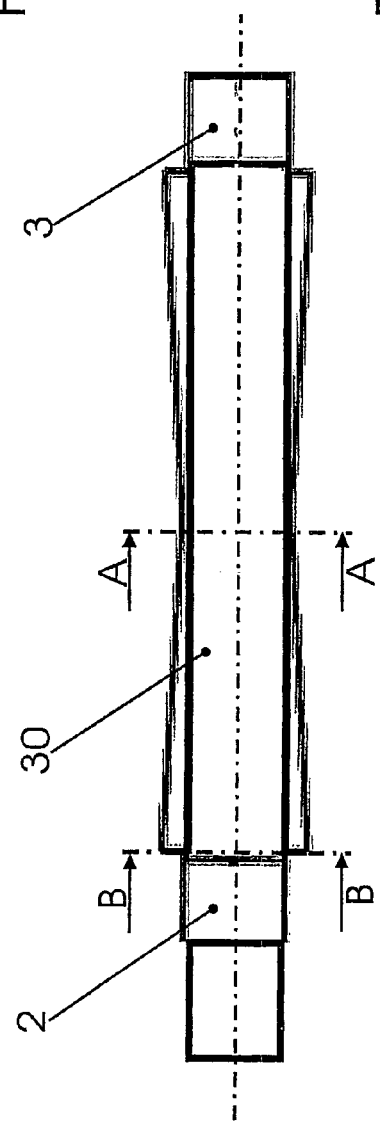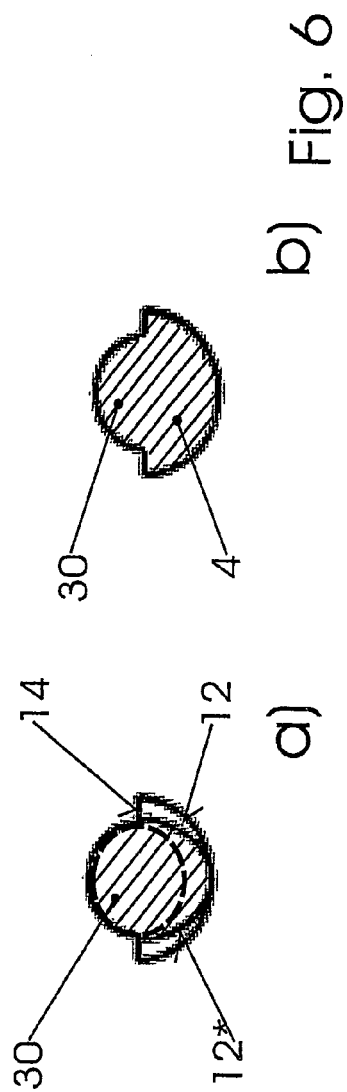

BALANCING SHAFT

CROSS-REFERENCE TO RELATED APPLICATIONS

This application is a National Stage of International Application No. PCT/AT2005/000446, filed Nov. 8, 2005, and which claims the benefit of Austrian Utility Model Application No. GM 803/2004, filed Nov. 8, 2004. The disclosures of the above applications are incorporated herein by reference.

FIELD

The invention relates to a balance shaft whose balance weight is located between two cylindrical bearing surfaces, with the end cross-sections of the balance weight at both sides being segments of a circle bounded by an arc of a circle and a secant.

BACKGROUND

The statements in this section merely provide background information related to the present disclosure and may not constitute prior art.

Balance shafts are used for the inertia balance of reciprocating engines, in particular internal combustion engines; in machines with four cylinders, pairwise in line and with double the crankshaft speed. With other numbers and arrangements of cylinders, balance shafts are also used in different arrangements from case to case.

The demands on a balance shaft are substantially always the same irrespective of the type of construction of the engine: 1° A maximum of effect, that is eccentricity of the center of gravity, should be achieved with as little mass as possible; and 2° the bearing arrangement should be as precise as possible, which requires a minimum of deflection under the effect of centrifugal force. The latter must in particular be taken into account with large bearing spacings. The demand for a quietly running drive can be left out of consideration when it is only a question of the balance shaft per se.

A balance shaft is known from DE 198 07 180 A1 which extends over the total spacing between the bearings and whose cross-section is constant throughout and is a segment of a circle. The extent over the total length is a helpful measure when the bearing spacing is pre-set and cannot be reduced for various reasons. If, however, the development of the load due to the centrifugal force over the length is looked at with the eyes of a structural engineer, it can be recognized that the shape of the balance weight is not optimum.

SUMMARY

It is therefore the object of the invention to further develop a generic balance shaft such that the mass effect and the stiffness are optimum. This is achieved in accordance with the invention in that the contour of the balance weight in the plane spanned by the secants of the two segments of a circle converges constantly from both end cross-sections up to the longitudinal center and in that the contour is a straight line in a normal plane to the plane defined above, said normal plane containing the axis of the shaft. The cross-sections of the balance weight thereby become ever smaller starting from the segments of the circle at the end surfaces up to the longitudinal center. For illustration: in the ideal case they become ellipses whose small axis becomes ever shorter and whose large half-axis is equal to the radius of the segment of a circle. In the eyes of the structural engineer, this means that the load transverse to the axis is not constant over the length (as in accordance with the prior art cited above), but reduces toward the longitudinal center, but not its stiffness. The deflection of the balance shaft with the same eccentric effect is thereby smaller, which is beneficial for its bearing arrangement. The bearing clearances can, for example, thereby be selected to be smaller.

The advantages of the design in accordance with the invention are also particularly effective with respect to production costs when the balance shaft is integral with the balance weight and substantially extends over the whole spacing between the cylindrical bearing surfaces.

In a further development of the invention, the stiffness of the shaft can be increased even further with a minimum increase in mass when the balance shaft has a stiffening rib, which can also be very narrow, on the side of the plane spanned by the secants of the two segments of a circle remote from its center of gravity. The contour of the stiffening rib in a normal plane to the said plane can be a straight line.

In a modified embodiment, the contour of the stiffening rib in the axially normal cross-section can be at least approximately the same as the cylindrical bearing surfaces. This has the advantage that there is no abrupt cross-sectional transition between the cylindrical bearing surface and the side of the balance weight remote from the eccentric center of gravity.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 illustrates a longitudinal section through a balance shaft in accordance with the invention;

FIG. 2 illustrates a longitudinal section as in FIG. 1; shaft rotated through 90 degrees;

FIG. 3 illustrates in a) section AA and in b) section BB in FIG. 2;

FIG. 4 illustrates a longitudinal section through a variant of the balance shaft in accordance with the invention;

FIG. 5 illustrates a longitudinal section as in FIG. 4; shaft rotated through 90 degrees;

FIG. 6 illustrates in a) section AA and in b) section BB in FIG. 5.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIGS. 1 and 2, the balance shaft in accordance with the invention is designated in summary by 1. It substantially has first and second cylindrical bearing surfaces 2, 3 with which it is supported in bearings of their housings, which are not shown, and a balance weight 4. This balance weight 4 is integral with the shaft 1; the reference line 4 points to its center of gravity S. Outside the bearing surfaces 2, 3, two further balance weights 5, 6 can be seen here which are not necessary and which can be configured in accordance with the invention or also not. Finally, the axis of rotation of the shaft 1 is designated by 7.

The balance weight 4, whose shape is essential to the invention, is located between the two bearing surfaces 2, 3. At each of its first end face 10 and its second end face 11, the balance weight 4 has a cross-section which has the shape of a segment of a circle and is bounded by an arc of a circle 12 and a secant 13. If the secant intersects the axis 7, the segment of a circle is a segment of a semi-circle. The secant could, however, also lie above the axis 7, that is at the side of the axis 7 remote from the center of gravity S. Starting from these end cross-sections 10, 11, the balance weight 4 has particular contours. For their description, first a plane 14 spanned by the secants 13 of the two end cross-sections 10, 11 and a normal plane 17 normal thereto and containing the axis 7 are introduced.

The contour 15 in the plane 14 converges, starting from the two end cross-sections 10, 11, toward the longitudinal center 18 in which it forms a "waist", see FIG. 2. In the normal plane 17 (see FIG. 1), the contour 16 is a straight line. With reference to the sections a), b) of FIG. 3, the cross-sectional extent of the balance weight 4 over its length can be recognized. In FIG. 3b, the cross-section is the described end cross-section bounded by an arc of a circle 12; toward the center, the cross-section becomes ever smaller up to the cross-section of FIG. 3a) with a dimension remaining the same in the normal plane 17 (the straight-line contour 16) in the plane 14 spanned by the secants. There, if one speaks of an ellipse for reasons of simplicity (but it could be any desired oval), the large half-axis 20 of the ellipse is equal to the radius of the arc of the circle 12, that is unchanged with respect to the straight line 16, and the small half-axis 21 of the ellipse is much smaller, for example equal to the radius of the cylindrical bearing surfaces 2, 3. In FIG. 3a), the cross-section is designated by 10* and the arc of the ellipse by 12*. This cross-sectional development has the consequence that with a stiffness approximately equal over the length, the mass load due to the centrifugal force per length unit in the waist is a minimum. The distribution of the bending moment exerted by the centrifugal force is thereby more favorable than with a non-waisted balance weight. For the further improvement of the stiffness, a stiffening rib 22 is provided on the side of the plane 14 spanned by the secant and is provided remote from the center of gravity S, said stiffening rib extending between the two bearing surfaces 2, 3 over the total length with a straight contour 23.

The variant of FIG. 4 to FIG. 6 differs from this in that the stiffening rib 30 takes over the cross-section of one of the two cylindrical bearing surfaces 2, 3 (or of both).

The description is merely exemplary in nature and, thus, variations that do not depart from the gist of the present disclosure are intended to be within the scope of the invention. Such variations are not to be regarded as a departure from the spirit and scope of the present disclosure.

What is claimed is:

1. A balance shaft having a single balance weight between two cylindrical bearing surfaces, the centre of gravity of said balance weight being offset with respect to the axis of rotation of the shaft, with the end cross-sections of the balance weight at both sides being segments of a circle bounded by an arc of a circle and a secant, wherein the contour of the balance weight in the plane spanned by the secants of the two end cross-sections converges constantly from both end cross-sections up to the longitudinal center; and wherein the contour of the radially outer side of the balance weight in a normal plane to the same plane is a straight line, with the normal plane extending along the axis of rotation of the shaft through the centers of the bearing surfaces.

2. A balance shaft in accordance with claim 1, wherein the shaft is integral with the balance weight and extends substantially over the whole spacing between the cylindrical bearing surfaces.

3. A balance shaft in accordance with claim 1, wherein the balance weight has a stiffening rib on the side of the plane spanned by the secants of the two end cross-sections, said side being remote from its center of gravity.

4. A balance shaft in accordance with claim 3, wherein the contour of the stiffening rib is a straight line in the normal plane to the said plane.

5. A balance shaft in accordance with claim 3, wherein the cross-section of the stiffening rib in an axially normal plane approximately corresponds to the cross-section of the cylindrical bearing surfaces.

6. A balance shaft in accordance with claim 1 further including an additional balancing weight positioned axially remote from an area between the bearing surfaces.

7. A balance shaft, comprising:
a pair of spaced apart cylindrical bearing surfaces axially aligned along an axis of balance shaft rotation; and
a balance weight axially positioned between the bearing surfaces having a center of gravity offset from the shaft axis of rotation, ends of the balance weight each having larger cross-sectional areas than a cross-sectional area at a longitudinal center of the shaft, an outer surface of each end being at least partially defined by a circular arc and a secant of the arc, the cross-section at the longitudinal center being at least partially defined by an oval segment inscribed within the circular arc and having a point coincident with the circular arc such that the balance weight tapers from each end toward the longitudinal center.

8. A balance shaft in accordance with claim 7, wherein the contour of the outer surface of the balance weight is defined by a straight line extending substantially parallel to the axis of rotation and intersecting the point coincident with the circular arc and the oval segment.

9. A balance shaft in accordance with claim 7, wherein the secant intersects the axis of rotation.

10. A balance shaft in accordance with claim 7, wherein the circular arcs extend greater than 180 degrees.

11. A balance shaft in accordance with claim 7, further including an additional balancing weight positioned axially remote from an area between the bearing surfaces.

12. A balance shaft in accordance with claim 7, wherein the shaft is integral with the balance weight and extends substantially over the whole spacing between the cylindrical bearing surfaces.

13. A balance shaft in accordance with claim 7, wherein the balancing weight includes an axially extending rib radially protruding from a surface defined by the secant.

14. A balance shaft in accordance with claim 13, wherein the rib includes a distal end surface substantially aligned with the bearing surface.

15. A balance shaft in accordance with claim 14, wherein the rib lies in a plane including the axis of rotation and the point coincident with the circular arc and the oval segment.

16. A balance shaft in accordance with claim 13 wherein the rib includes a cross-section shaped to substantially correspond to the cross-section of the bearing surfaces.

17. A balance shaft in accordance with claim 7 wherein the shaft and balancing weight define a solid monolithic structure.

* * * * *